(12) United States Patent
Rumpunen et al.

(10) Patent No.: US 9,780,832 B2
(45) Date of Patent: Oct. 3, 2017

(54) USE OF AN APPARATUS FOR CONFIGURING COMMUNICATION-RELATED PARAMETERS

(71) Applicant: Teleste Oyj, Littoinen (FI)

(72) Inventors: Toni Rumpunen, Raisio (FI); Perttu Fagerlund, Turku (FI); Tommi Ketola, Turku (FI); Sami Halen, Kaarina (FI); Pekka Hilke, Turku (FI)

(73) Assignee: TELESTE OYJ, Littoinen (FI)

( * ) Notice: Subject to any disclaimer, the term of this patent is extended or adjusted under 35 U.S.C. 154(b) by 0 days.

(21) Appl. No.: 14/934,494

(22) Filed: Nov. 6, 2015

(65) Prior Publication Data

US 2016/0134329 A1 May 12, 2016

(30) Foreign Application Priority Data

Nov. 7, 2014 (EP) .................................... 14397531

(51) Int. Cl.
| | |
|---|---|
| *H04B 3/46* | (2015.01) |
| *H04L 27/00* | (2006.01) |
| *H04B 3/04* | (2006.01) |
| *H04H 60/97* | (2008.01) |
| *H04N 7/10* | (2006.01) |
| *H04N 7/173* | (2011.01) |
| *H04N 21/61* | (2011.01) |
| *H04H 20/79* | (2008.01) |

(52) U.S. Cl.
CPC ................. *H04B 3/46* (2013.01); *H04B 3/04* (2013.01); *H04H 20/79* (2013.01); *H04H 60/97* (2013.01); *H04L 27/0002* (2013.01); *H04N 7/102* (2013.01); *H04N 7/17318* (2013.01); *H04N 21/6118* (2013.01); *H04N 21/6168* (2013.01)

(58) Field of Classification Search
CPC ........... H04N 21/6118; H04N 21/6168; H04N 7/17309
See application file for complete search history.

(56) References Cited

U.S. PATENT DOCUMENTS

| | | | | |
|---|---|---|---|---|
| 5,225,902 | A * | 7/1993 | McMullan, Jr. | ........ H04H 20/42 348/E7.049 |
| 6,678,893 | B1 | 1/2004 | Jung | |
| 7,089,580 | B1 * | 8/2006 | Vogel | ..................... H04H 20/78 348/E7.07 |
| 2005/0114879 | A1 | 5/2005 | Kamieniecki | |
| 2009/0170547 | A1 * | 7/2009 | Raghothaman | ....... H04L 1/0002 455/522 |
| 2012/0044361 | A1 | 2/2012 | Riggsby | |

FOREIGN PATENT DOCUMENTS

EP          1359696          11/2003

OTHER PUBLICATIONS

European Search Report for EP Application No. 14397531.6 dated Apr. 28, 2015, 6 pages.

* cited by examiner

*Primary Examiner* — Ross Varndell
(74) *Attorney, Agent, or Firm* — Hollingsworth Davis, LLC

(57) ABSTRACT

The invention relates to a use of an apparatus for configuring two or more communication-related parameters in a cable modem system. The apparatus comprises a processor, a cable television signal input interface for receiving one or more cable television signals, and a cable modem termination system unit for providing access to a communication network.

6 Claims, 8 Drawing Sheets

USE OF AN APPARATUS FOR CONFIGURING COMMUNICATION-RELATED PARAMETERS

TECHNICAL FIELD

The present disclosure relates generally to cable modem systems, and more specifically, to a use of an apparatus for configuring communication-related parameters in cable modem systems. Moreover, the present disclosure relates to a method for configuring one or more communication-related parameters in cable modem systems, via an apparatus.

BACKGROUND

Today, cable modem systems are widely used to provide an Internet connection in buildings, where Hybrid Fibre Coax (HFC) cables are already in place for cable television. A cable modem system employs a Cable Modem Termination System (CMTS) to provide the Internet connection to a plurality of cable modems.

Configuring the CMTS, for example, during an installation phase or at a later time when changes take place in a setup of the cable modem system, is typically a manual process, and therefore, is prone to human errors. Thus, installation and configuration of the CMTS requires expertise.

Typically, a person installing and/or configuring the CMTS has to perform one or more measurements in a cable television network to find which channels are free, and to set levels of signals accordingly. Moreover, the person has to organize and adjust channels manually.

SUMMARY

The present disclosure seeks to provide a use of an apparatus for configuring two or more communication related parameters. The apparatus comprises
a processor;
a cable television signal input interface for receiving one or more cable television signals; and
a cable modem termination system unit for providing access to a communication network.

In another aspect, an embodiment of the present disclosure provides a method for configuring one or more communication-related parameters in a cable modem system, via an apparatus, the method comprising:
(a) sending a request to at least one cable modem to measure a signal strength of a signal received by the at least one cable modem;
(b) receiving two or more signal strength measurements from the at least one cable modem; and
(c) adjusting the two or more communication-related parameters to be used for communication with the at least one cable modem, based at least partially on the two or more signal strength measurements.

DETAILED DESCRIPTION OF THE INVENTION

Figure 1:
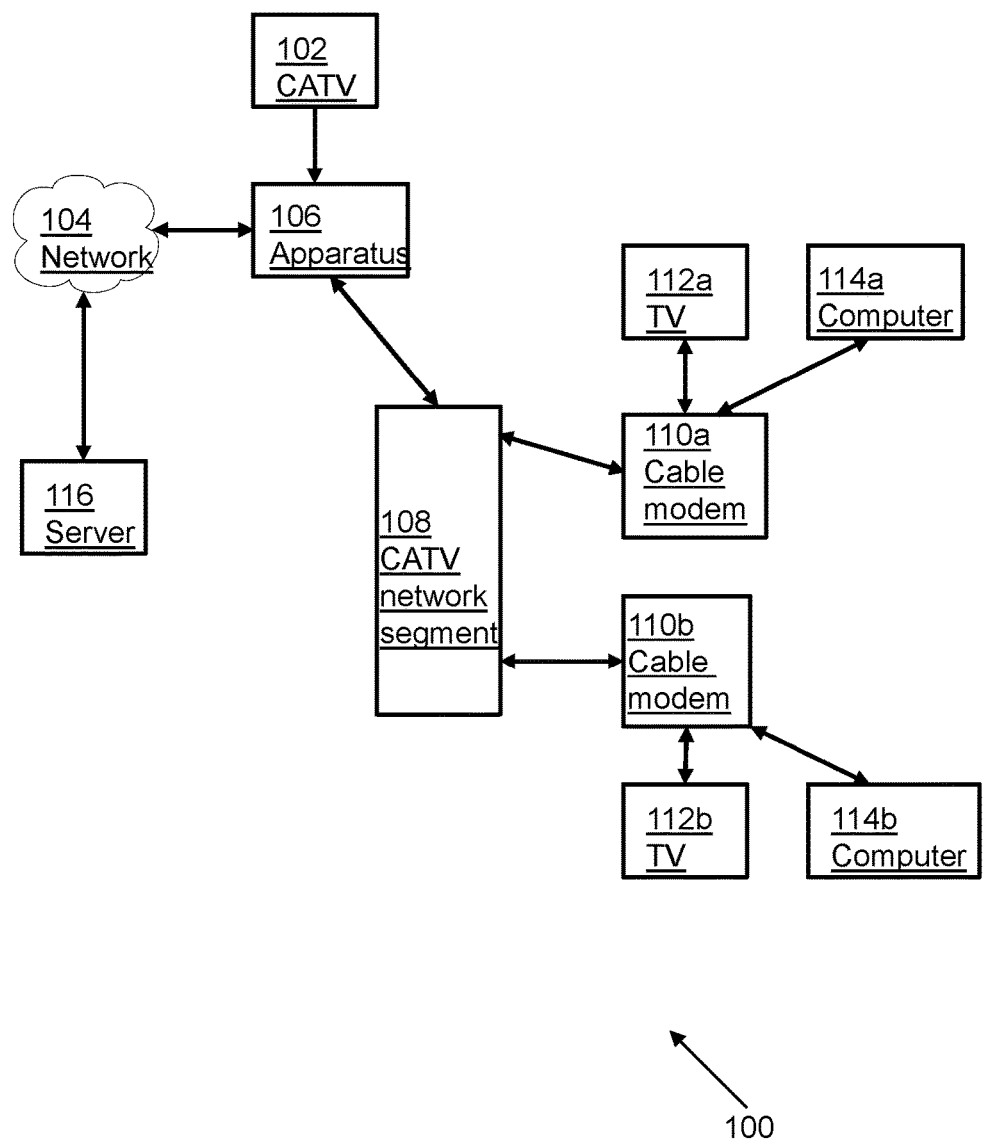
FIG. 1 is a schematic illustration of an example environment that is suitable for practicing embodiments of the present disclosure.

The following detailed description illustrates embodiments of the present disclosure and ways in which they can be implemented.

The present disclosure seeks to provide a use of an apparatus for configuring two or more communication related parameters. The apparatus comprises
a processor;
a cable television signal input interface for receiving one or more cable television signals; and
a cable modem termination system unit for providing access to a communication network.

Optionally the apparatus further comprises a memory coupled to the processor, the memory storing a first computer-readable program code that, when executed on the processor, is configured to send a request to at least one cable modem to measure a signal strength of a signal received by the at least one cable modem, to receive two or more signal strength measurements from the at least one cable modem, and to adjust the two or more communication-related parameters to be used for communication with the at least one cable modem, based at least partially on the two or more signal strength measurements.

Optionally, the two or more signal strength measurements pertain to at least two different frequencies. Optionally, the two or more signal strength measurements pertain, at least, to one or more low frequencies and one or more high frequencies. Additionally, optionally, the one or more signal strength measurements pertain to one or more medium frequencies, namely frequencies intermediate between the one or more low frequencies and the one or more high frequencies. The one or more low frequencies may, for example, range from 50 MHz to 300 MHz. The one or more high frequencies may, for example, range from 600 MHz to 900 MHz.

Moreover, optionally, the first computer-readable program code, when executed on the processor, is configured to adjust the two or more communication-related parameters to be used for communication with the at least one cable modem. Optionally, the two or more communication-related parameters are adjusted based at least partially on the two or more signal strength measurements. Beneficially, the two or more communication-related parameters are adjusted automatically. As a result, chances of manual mistakes during configuration of the apparatus are potentially prevented.

Additional benefits include that the apparatus can be configured to self-configure to the network. Optionally, the two or more communication-related parameters comprise at least one of: gain, slope, and optionally amplification, and/or Signal-to-Noise ratio (S/N).

The gain is generally defined as a ratio of a power delivered to an output to a power available from an input. In an example, the amplifier can be taken as the input of the apparatus, while a diplex filter (also known as a diplexer) can be taken as the output of the apparatus. The gain is generally expressed in decibels (dB).

In a typical coaxial cable, signal losses are greater at high frequencies than at low frequencies. Thus, in order to provide a homogeneous signal, an amplifier should amplify low frequency signals less than high frequency signals. This is called a "slope correction". In order to achieve proper slope correction, it is advantageous to determine how much the gain for low frequencies should be lower than the gain for high frequencies. This is called a "slope adjust". The slope adjust is generally expressed as difference in amplification (decibels (dB)) between the lowest frequency and the highest frequency of a cable television (CATV) system.

The Signal-to-Noise ratio (S/N) is defined as a ratio of a power of a signal to a power of a noise. The S/N is a measurement of how many times the power of the signal is greater than the power of the noise. The S/N is usually expressed in decibels (dB). Optionally, a second computer-readable program code, when executed on the processor, is configured to allocate at least one of the one or more free frequency bands for transmission of at least one transport stream between the apparatus and the at least one cable modem.

The first computer-readable program code, and the second computer-readable program code can be separate programs running in the apparatus or they can be combined to run as a single program.

Moreover, optionally, the apparatus also comprises a programmable controllable switch for switching ON/OFF the one or more cable television signals. The switch can refer to a programmable controllable radio frequency (RF) switch which can be used to turn a RF signal ON or OFF. The use of apparatus thus comprises switching OFF RF signal for example during signal strength measurements. This way signals from CATV system do not interfere with the signal strength measurements. In addition, turning the switch OFF during the measurement enables to make the measurements on frequency bands allocated normally by the CATV system RF signal.

Furthermore, optionally, the apparatus conforms to Data Over Cable Service Interface Specification (DOCSIS).

In one aspect, an embodiment of the present disclosure provides a method for configuring two or more communication-related parameters in a cable modem system, via an apparatus, the method comprising:
(a) sending a request to at least one cable modem to measure a signal strength of a signal received by the at least one cable modem;
(b) receiving two or more signal strength measurements from the at least one cable modem; and
(c) adjusting the two or more communication-related parameters to be used for communication with the at least one cable modem, based at least partially on the two or more signal strength measurements.

Optionally, the two communication-related parameters to be adjusted in the method are gain and slope.

Optionally, the two or more communication-related parameters are adjusted automatically. Optionally, the method further comprises switching OFF one or more cable television signals during the measurement of two or more cable television signals.

An example of an environment that is suitable for practicing embodiments of the present disclosure is an environment including a cable television (CATV) system, a communication network, one or more apparatus (es) for configuring communication-related parameters according to this description, a cable television (CATV) network segment, a plurality of cable modems, a plurality of television (TV) sets, and a plurality of computing devices. The CATV network segment includes cables for connectivity, passive and active radio frequency components wall outlets, splitters, tappers etc.

The present apparatus may be connected to the CATV system, for example, via a digital/analogue interface. The apparatus is operable to receive one or more CATV signals broadcasted by the CATV system.

The apparatus may be connected to the communication network, for example, via a network interface. The communication network can be a collection of individual networks, interconnected with each other and functioning as a single large network. Such individual networks may be wired, wireless, or a combination thereof. Examples of such individual networks include, but are not limited to, Local Area Networks (LANs), Wide Area Networks (WANs), Metropolitan Area Networks (MANs), Wireless LANs (WLANs), Wireless WANs (WWANs), and Wireless MANs (WMANs). An example of the communication network is the Internet.

Optionally, the environment also includes one or more servers that are accessible via the communication network. The server may, for example, be running a web service that may be accessed by users associated with the computing devices.

Optionally, the apparatus is operable to receive data packets from the server, via the communication network. Optionally, the apparatus is operable to convert the data packets into data signals that are suitable for transmission over Hybrid Fibre Coax (HFC) cables.

According to an embodiment, the apparatus is connected to a cable television network segment (with elements such as splitters, cables, tappers), which provides a connection to cable modems. Computing devices such as computers, tablet computers, game consoles, smart phones or smart televisions are connected to the cable modem in order to get a data connection. The apparatus is further connected to a communication network such as Internet. The CMTS unit of the apparatus is used to facilitate Internet data connection between the communication network and the cable modems connected to the CATV network segment. Further, the television signal is received from the CATV network and is fed via the apparatus to the CATV network segment. The television sets can be connected to CATV the network segment for providing television services.

The cable modems can be also connected to their respective TV sets, and to their respective computing devices of the TV sets. Connections between TV sets and the cable modems can be provided by coaxial cables or HFC cables or as wired or wireless data connection. The connections between the cable modems and their respective computing devices can thus be either wired or wireless. Further there might be communication devices such as routers between the cable modems and the computing devices.

In a downstream path from the apparatus to the cable modem, the CATV network segment may receive signals from the present apparatus, and feed these signals to the cable modems via HFC or coaxial cable or similar connectivity. Optionally, in the downstream path, the signals include the one or more CATV signals and/or one or more data signals pertaining to data downloaded via the communication network. A frequency range of 50 MHz to 1000 MHz might be used for the downstream path communication.

Upon receiving the one or more CATV signals from the present apparatus, the cable modems may provide their respective TV sets with TV-related information, either directly or via a TV decoder box. This enables the TV sets to provide their users with TV content for viewing. In an example setup, the cable modem is used only for the data connection. The data connection can be for example an Internet Protocol connection. Television related information can be derived from the information in a cable television signal of each television channel or channel bundle. An example of such information might be a Digital Video Broadcasting for cable television (DVB-C) channel guide.

Likewise, upon receiving the one or more data signals from the present apparatus, the cable modems can provide their respective computing devices with data downloaded, for example via the communication network, by their respective computing devices.

In an upstream path from the cable modem to the apparatus, the cable television network segment combines signals from the cable modems, and feeds these signals to the apparatus. Optionally, in the upstream path, the signal(s) includes one or more data signals pertaining to data uploaded by at least one of the computing devices.

Examples of the computing devices include, but are not limited to, smart telephones, Mobile Internet Devices (MID's), tablet computers, Ultra-Mobile Personal Computers (UMPC's), phablet computers, Personal Digital Assistants (PDA's), web pads, laptops, Personal Computers (PC's), handheld PC's, and Internet Protocol (IP) TV receivers or smart televisions.

In a first example, the environment could be implemented in a hotel TV and Internet system. In the first example, a plurality of cable modems, such as the cable modems, could be installed in a plurality of hotel rooms.

In an example, the environment could be implemented in a hotel TV and Internet system. In this example, a plurality of cable modems could be installed in a plurality of hotel rooms. Most typically, there is one cable modem per room.

In another example, the environment could be implemented in a TV and Internet system for households with a plurality of apartments within a building. In this example, a plurality of cable modems could be installed in the plurality of apartments. Most typically, there is one cable modem per apartment.

The CMTS (cable modem termination system) unit of the present description may comprise a CMTS downstream unit and a CMTS upstream unit. Additionally, optionally, the apparatus of the present description comprises also a combiner, a diplex filter (also known as a diplexer), an attenuator, and one or more amplifiers. The memory, the spectrum analyser, the CMTS unit and the programmable controllable switch (when used) can be coupled to the processor.

According to one embodiment, the CATV signal input interface receives one or more CATV signals from a CATV system. The one or more CATV signals are then amplified by the amplifier, and fed to the spectrum analyser. The CMTS unit can be operable to receive data packets, via a communication network. Optionally, the CMTS downstream unit is operable to convert the data packets into downstream data signals that are suitable for transmission over HFC cables within the CATV network segment. The CMTS downstream unit is then operable to transmit the downstream data signals to the amplifier, which amplifies the downstream data signals and feeds the amplified data signals to the combiner.

The combiner combines the amplified data signals to the one or more CATV signals to produce combined signals. The combiner then feeds these combined signals to the amplifier and the amplifier then amplifies the combined signals and feeds them through the diplexer for transmission to the cable modem system, namely, one or more cable modems that are communicably coupled to the apparatus, for example, via a cable television network segment.

Moreover, the CMTS upstream unit can be operable to receive one or more upstream data signals from the one or more cable modems, via a diplexer and an attenuator. The diplexer enables bi-directional communication, namely transmission of downstream and upstream data signals, over a single HFC cable. The attenuator attenuates the one or more upstream data signals, and feeds the attenuated data signals to the CMTS upstream unit.

The CMTS upstream unit is then, in this embodiment, operable to convert these data signals into data packets that are suitable for transmission over the communication network. The data packets include, but are not limited to, Internet Protocol (IP) packets. Subsequently, the CMTS unit is operable to transmit the data packets across the communication network.

Moreover, optionally, the processor is operable to use communication capabilities of the CMTS unit to communicate with one or more servers over the communication network. In an example, the processor is operable to receive information, for example, including software updates and/or settings over the communication network.

Additionally or alternatively, optionally, the processor is operable to use communication capabilities of the CMTS unit to communicate with the one or more cable modems, as will be elucidated below.

The optional first computer-readable program code may thus be configured to send the request to at least one of the cable modems via the CMTS downstream unit, and to receive one or more signal strength measurements from the cable modems via the CMTS upstream unit.

Moreover, this optional first computer-readable program code is configured to adjust the communication-related parameters to be used for communication with the cable modems, namely, for communication between the CMTS unit and the cable modems.

Optionally, the memory stores at least one of: the one or more signal strength measurements, configurations of the one or more communication-related parameters, and/or other software associated with the cable modem system.

Moreover, optionally, the switch is programmed and controlled by the processor to switch OFF the one or more CATV signals received from the CATV system, during the analysis of the spectrum by the spectrum analyser. The one or more CATV signals are can be optionally switched OFF during measurement with the spectrum analyser to measure high and low frequencies that are possibly allocated by the CATV system for transporting the one or more CATV signals. The switch can refer to a programmable controllable radio frequency (RF) switch which can be used to turn RF signal ON or OFF.

Further, optionally, the switch is programmed and controlled by the processor to switch OFF the one or more CATV signals received from the CATV system, during the measurement of downstream signal strengths from the cable modems connected to CATV network segment.

Optionally, in an alternative implementation, an optical receiver of the apparatus is controlled by the processor to switch OFF the one or more CATV signals, during the analysis of the spectrum and/or measurement of downstream signal strength from the cable modems.

Optionally, the spectrum analyser and/or the processor are operable to determine one or more free frequency bands that are unallocated in the spectrum, based upon the analysis of the spectrum.

The optional second computer-readable program code is configured to allocate at least one of the free frequency bands for transmission of at least one transport stream between the apparatus and the one or more cable modems. In an example, the at least one of the one or more free frequency bands is allocated for transmission of one or more downstream data signals from the CMTS unit to the one or more cable modems and/or one or more upstream data signals from the one or more cable modems to the CMTS unit.

Embodiments of the present disclosure are susceptible to being used for various purposes, including, though not limited to, facilitating an automatic configuration of communication-related parameters in cable modem systems.

An embodiment of the present disclosure provides also a computer program product comprising a non-transitory computer-readable data storage medium having stored thereon computer-readable program code, which is executable by a processor of an apparatus to implement the method as described above.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

Embodiments of the present disclosure will now be described, by way of example only, with reference to the following diagrams wherein FIG. 1 is a schematic illustration of an example environment 100 that is suitable for practicing embodiments of the present disclosure. The environment 100 includes a cable television (CATV) system 102, a communication network 104, one apparatus 106 for configuring communication-related parameters, a cable television (CATV) network segment 108, a plurality of cable modems, depicted as a cable modem 110a and a cable modem 110b in FIG. 1 (hereinafter collectively referred to as cable modems 110), a plurality of television (TV) sets, depicted as a TV set 112a and a TV set 112b in FIG. 1 (hereinafter collectively referred to as TV sets 112), a plurality of computing devices, depicted as a computing device 114a and a computing device 114b in FIG. 1 (hereinafter collectively referred to as computing devices 114).

The apparatus 106 is connected to the CATV system 102 via a digital/analogue interface and it is operable to receive one or more CATV signals broadcasted by the CATV system 102. The apparatus 106 is connected to the communication network 104 via a network interface. The environment 100 also includes one server 116 that is accessible via the communication network 104. The apparatus 106 is connected to the CATV network segment 108, which is connected to the cable modems 110. The cable modems 110 are connected to their respective TV sets 112, and to their respective computing devices 114.

In a downstream path, the CATV network segment 108 receives signals from the apparatus 106, and feeds these signals to the cable modems 110.

Upon receiving the one or more CATV signals from the apparatus 106, the cable modems 110 provide their respective TV sets 112 with TV-related information, either directly or via a TV decoder box. This enables the TV sets 112 to provide their users with TV content for viewing. Likewise, upon receiving the one or more data signals from the apparatus 106, the cable modems 110 provide their respective computing devices 114 with data downloaded, via the communication network 104, by their respective computing devices 114.

In an upstream path, the CATV network segment 108 receives signals from the cable modems 110, and feeds these signals to the apparatus 106.

FIG. 1 is merely an example, which should not unduly limit the scope of the claims herein. It is to be understood that the specific designation for the environment 100 is provided as an example and is not to be construed as limiting the environment 100 to specific numbers, types, or arrangements of CATV systems, apparatus, CATV network segment, cable modems, TV sets, computing devices, servers, and communication networks. A person skilled in the art will recognize many variations, alternatives, and modifications of embodiments of the present disclosure.

Figure 2:
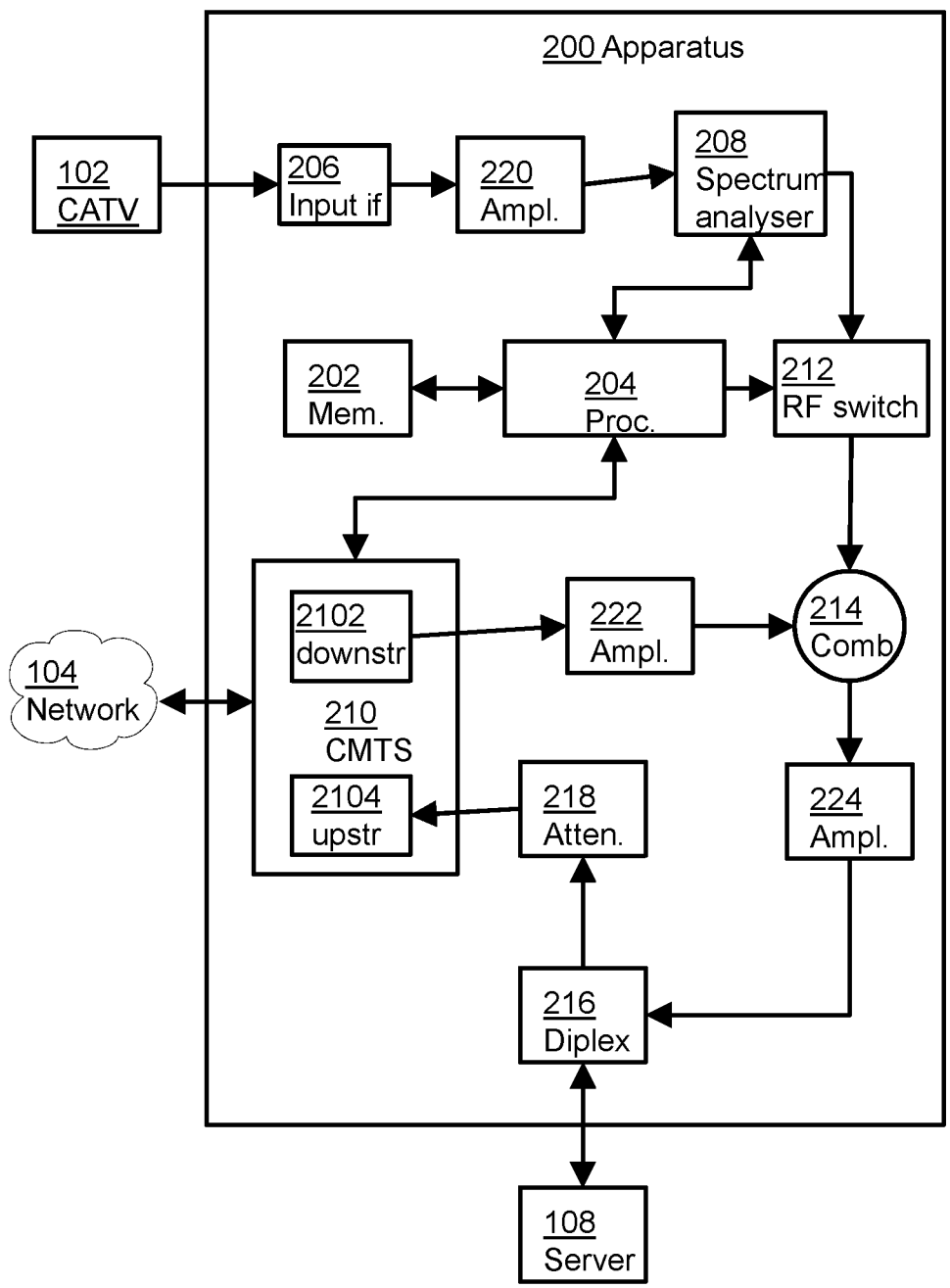
FIG. 2 is a schematic illustration of an apparatus for configuring one or more communication-related parameters in a cable modem system, in accordance with an embodiment of the present disclosure.

FIG. 2 is a schematic illustration of an apparatus 200 for configuring one or more communication-related parameters in a cable modem system, in accordance with an embodiment of the present disclosure.

The apparatus 200 includes a memory 202, a processor 204, a CATV signal input interface 206 in connection with a CATV system 102, a spectrum analyser 208, and a Cable Modem Termination System (CMTS) unit 210. The apparatus 200 also includes a programmable controllable RF (radio frequency) switch 212.

The CMTS unit 210 includes a CMTS downstream unit 2102 and a CMTS upstream unit 2104 and it is in connection with a communication network 104.

The apparatus 200 also includes a combiner 214, a diplex filter 216 which is communicably coupled to the present apparatus via a CATV network segment 108, an attenuator 218, and one or more amplifiers, depicted as an amplifier 220, an amplifier 222 and an amplifier 224.

The memory 202, the spectrum analyser 208, the CMTS unit 210 and the programmable controllable RF switch 212 are controllable by the processor 204.

FIG. 2 is merely an example, which should not unduly limit the scope of the claims herein. A person skilled in the art will recognize many variations, alternatives, and modifications of embodiments of the present disclosure.

Figure 3A:
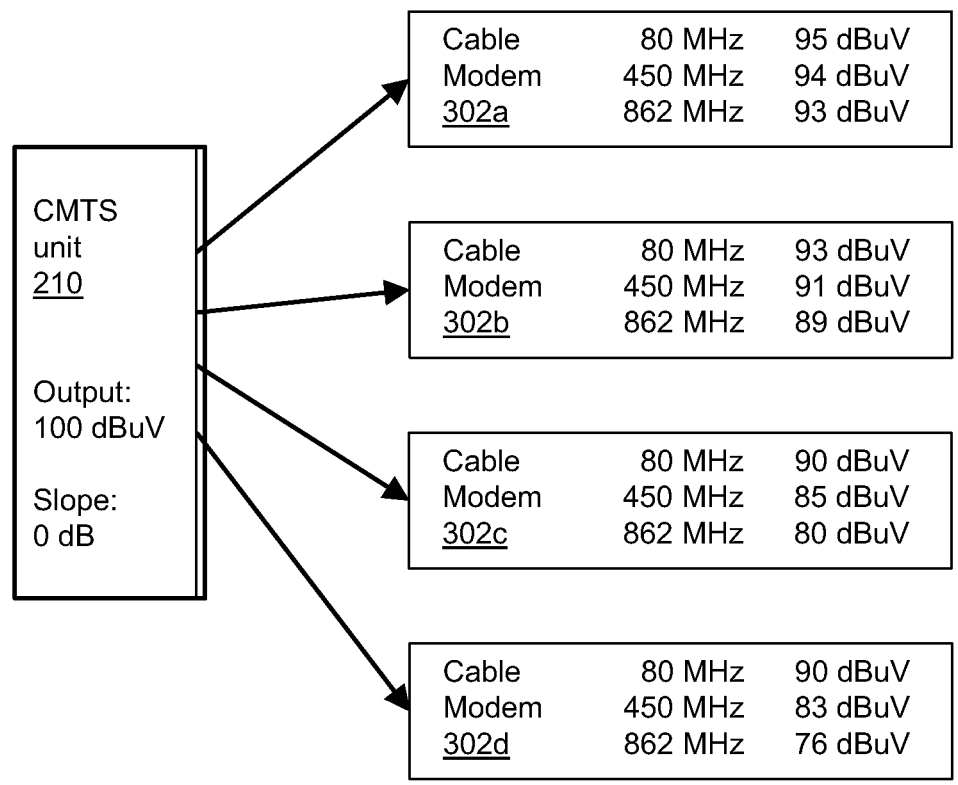
FIGS. 3A and 3B are illustrations of an example setup, before one or more communication-related parameters are configured for downstream signals, in accordance with an embodiment of the present disclosure.
Figure 3B:
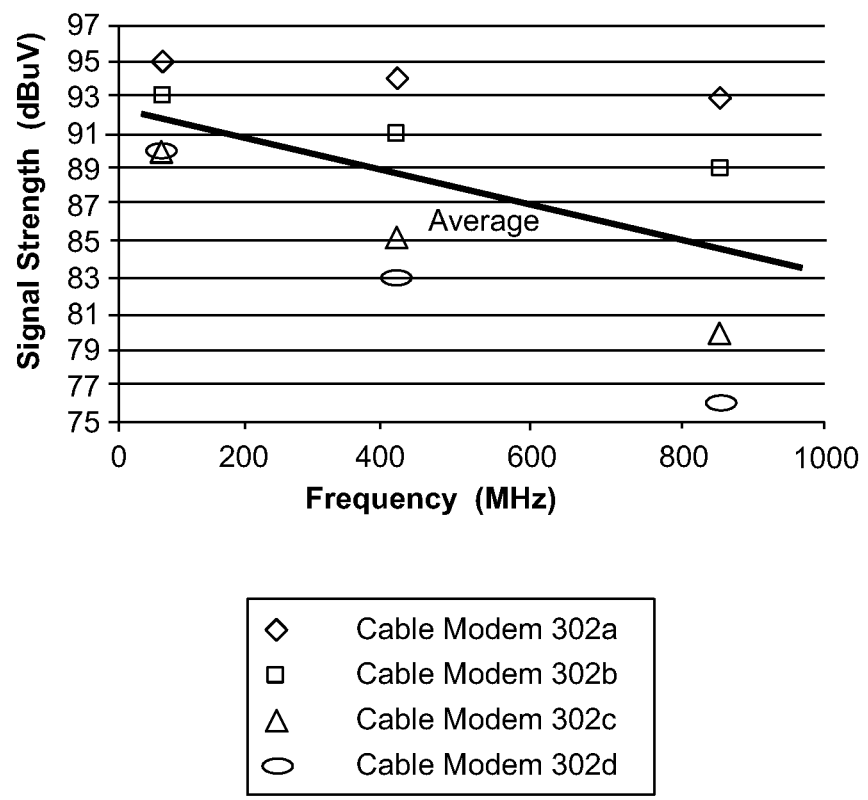

FIGS. 3A and 3B are illustrations of an example setup, before one or more communication-related parameters are configured for downstream signals, in accordance with an embodiment of the present disclosure. With reference to FIG. 3A, the CMTS unit 210 of the apparatus 200 is communicably coupled to four cable modems, namely, cable modems 302a, 302b, 302c and 302d (hereinafter collectively referred to as cable modems 302).

In the example setup, the CMTS unit 210 sends a request to the cable modems 302 to measure signal strengths of signals received at frequencies 80 MHz, 450 MHz and 862 MHz.

Initially, an output signal level of the apparatus 200 is set to 100 dBuV, and a slope is set to zero dB (0 dB).

FIGS. 3A and 3B show signal strength measurements taken by the cable modems 302, in tabular and graphical forms, respectively.

As described earlier, the apparatus 200 is operable to adjust the gain and the slope automatically, based on the signal strength measurements taken by the cable modems 302.

For illustration purposes only, there will now be considered an example where a desired input level for the cable modems 302 is 95 dBuV, and a frequency response is substantially flat for all frequencies. Consequently, the gain is adjusted to be +3 dB, and the slope is adjusted to be +9 dB.

Figure 4A:
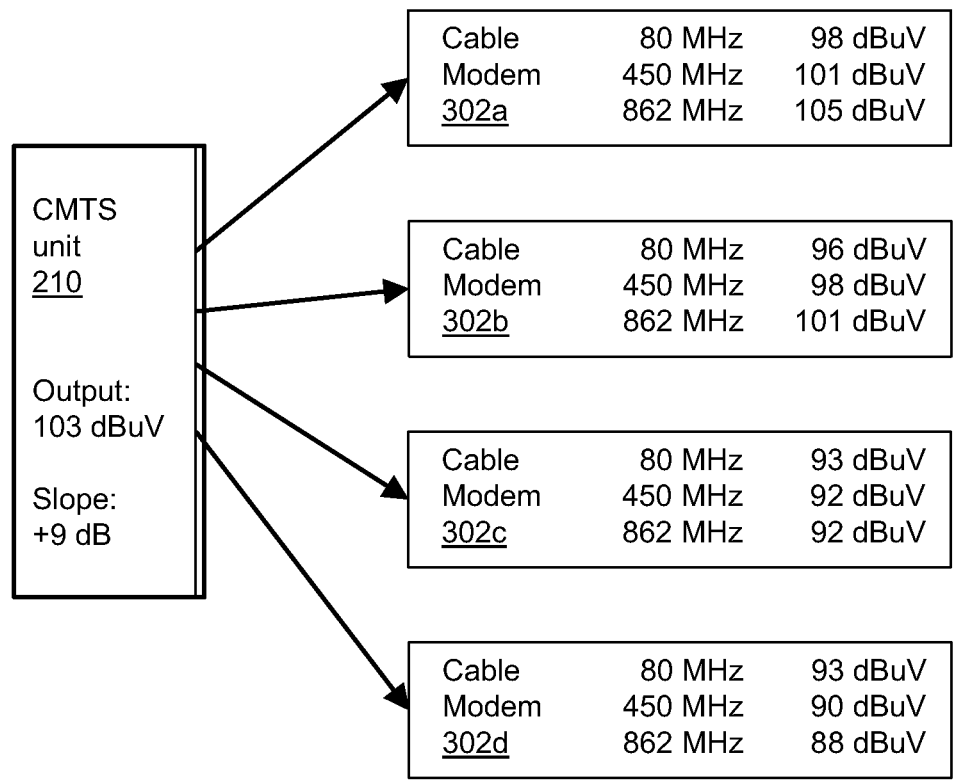
FIGS. 4A and 4B are illustrations of the example setup, after the one or more communication-related parameters are configured for the downstream signals, in accordance with an embodiment of the present disclosure.
Figure 4B:
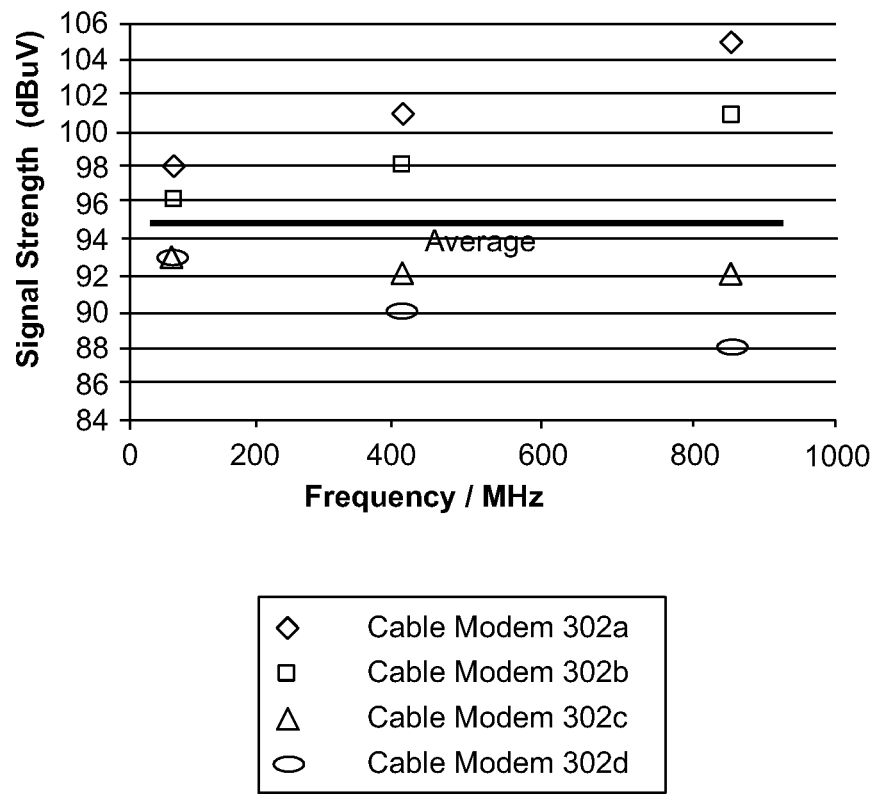

FIGS. 4A and 4B are illustrations of the example setup, after the one or more communication-related parameters are configured for the downstream signals, in accordance with an embodiment of the present disclosure. FIGS. 4A and 4B show signal strength measurements taken by the cable modems 302, in tabular and graphical forms, respectively. These signal strength measurements are taken after the gain and the slope are adjusted automatically by the apparatus 200.

Figure 5A:
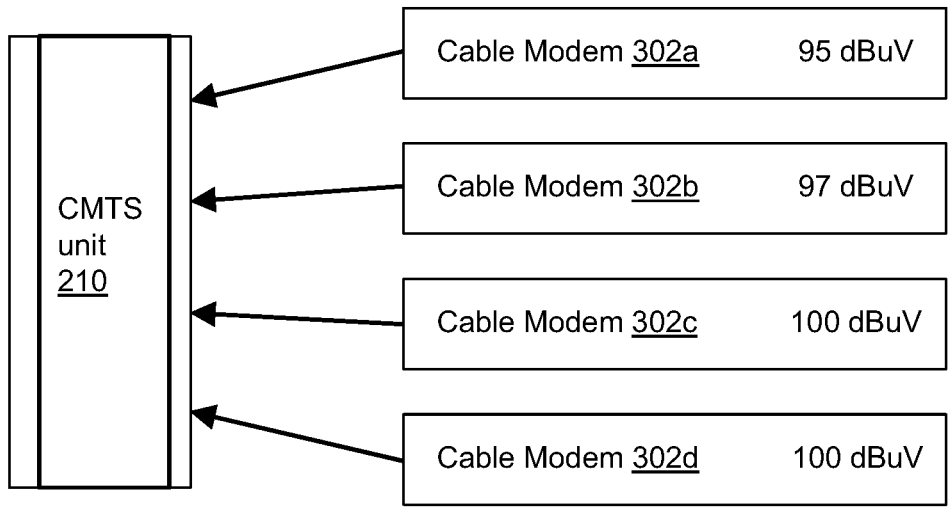
FIGS. 5A and 5B are illustrations of an example setup, before and after one or more communication-related parameters are configured for upstream signals, respectively, in accordance with an embodiment of the present disclosure.
Figure 5B:
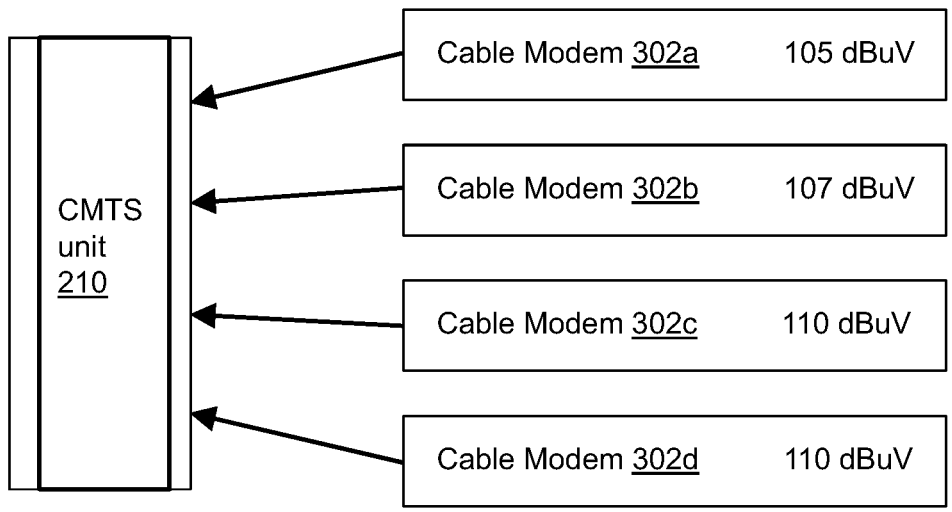

FIGS. 5A and 5B are illustrations of the example setup, before and after one or more communication-related parameters are configured for upstream signals, respectively, in accordance with an embodiment of the present disclosure.

Below is an example of steps for adjusting communication parameters to improve the signal to noise (S/N) ration of a cable modem system related to FIGS. 5A and 5B.

Step 1: Cable modem system setup/configuration starts with a registration phase, during which a set of parameters of each cable modem 302a-302d (i=1, 2, 3, 4 for 302a, 302b, 302c and 302d respectively) are collected by the CMTS unit 210. One of the parameters is a potential maximum transmit level ($TxLMax_i$) of a cable modem i. This way the apparatus 200 obtains information of a maximum signal power that is expected from at least one of the cable modems 302. In the present example, a maximum transmit level of a modem i is 110 dBuV (decibel micro volts). In the present example, the maximum transmit level is same for all of the modems i=1, 2, 3, 4.

Step 2: The CMTS unit 210 configures cable modems so that the CMTS unit 210 input level from each of the cable modems i=1 . . . 4 is substantially similar to each other. For example, the input level target is set to TxT=70 dBuV.

Step 3: The CMTS unit 210 sends a request to first cable modem (i=1) to communicate the current transmission level ($TxL_1$) of the modem 1. This step is repeated to all cable modems that are connected to the apparatus. FIG. 5A is an illustration of the current transmission levels $TxL_i$ for the cable modems 302 in a tabular form. The measured transmission levels in the present example for modems 302a-d are $TxL_1$=95 dBuV, $TxL_2$=97 dBuV, $TxL_3$=100 dBuV, $TxL_4$=100 dBuV, respectively.

Step 4: For each of the cable modem i, a transmit level margin ($TxM_i$) is calculated as $TxM_i=TxLMax_i-TxL_i$. The calculated transmit level margins in the present example for modems 302a-d are $TxM_1$=15 dBuV, $TxM_2$=13 dBuV, $TxM_3$=10 dBuV, $TxM_4$=10 dBuV, respectively.

Step 5: $TxM_i$ are analysed to find the smallest transmit level margin $TxM_{min}$. In the present example the smallest transmit level margin $TxM_{min}$=10 dBuV.

Step 6: The apparatus 200 adjusts the Signal-to-Noise ratio (S/N) automatically by adjusting an attenuation of the attenuator 218 automatically. The attenuator 218 is adjusted to attenuate with $TxM_{min}$=10 dBuV. This leads to decrease in the input level of the CMTS unit 210 by 10 dBuV.

Step 7: The CMTS unit 210 re-configures cable modems i=1, 2, 3, 4 so that the CMTS unit 210 input level from each cable modem is substantially similar to each other. In present example, the transmission levels of the modems 302a-d are set to $TxL_1$=105 dBuV, $TxL_2$=107 dBuV, $TxL_3$=110 dBuV, $TxL_4$=110 dBuV, respectively. As a result, the Signal-to-Noise ratio (S/N) improves by +10 dB.

FIG. 5B shows actual power measurements taken from the cable modems 302, after the Signal-to-Noise ratio (S/N) is improved.

FIGS. 3A-B, 4A-B and 5A-B are merely examples, which should not unduly limit the scope of the claims herein. A person skilled in the art will recognize many variations, alternatives, and modifications of embodiments of the present disclosure.

Figure 6:
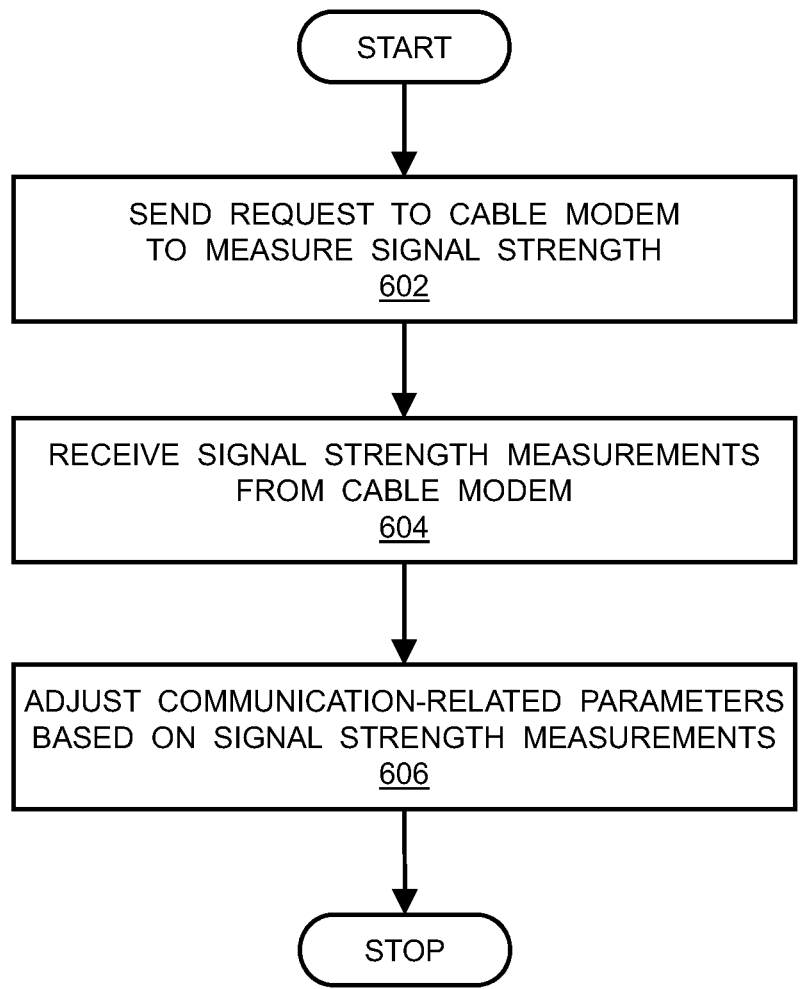
FIG. 6 is an illustration of steps of a method of configuring one or more communication-related parameters in a cable modem system, via the apparatus, in accordance with an embodiment of the present disclosure.

FIG. 6 is an illustration of steps of a method of configuring one or more communication-related parameters in a cable modem system, via an apparatus, in accordance with an embodiment of the present disclosure. The method is depicted as a collection of steps in a logical flow diagram, which represents a sequence of steps that can be implemented in hardware, software, or a combination thereof.

At step 602, the apparatus sends a request to at least one cable modem to measure a signal strength of a signal received by the at least one cable modem.

At step 604, the apparatus receives one or more signal strength measurements from the at least one cable modem.

Subsequently, at step 606, the apparatus adjusts the one or more communication-related parameters to be used for communication with the at least one cable modem.

In accordance with the step 606, the one or more communication-related parameters are adjusted based at least partially on the one or more signal strength measurements received at the step 604. The adjustment is done preferably after making at least two measurements as in step 606.

The step 606 is performed automatically. Optionally, the steps 602 to 606 are performed automatically.

The steps 602 to 606 are only illustrative and other alternatives can also be provided where one or more steps are added, one or more steps are removed, or one or more steps are provided in a different sequence without departing from the scope of the claims herein.

The invention claimed is:

1. An apparatus comprising:
a processor;
a cable television signal input interface for receiving one or more cable television signals;
a cable modem termination system (CMTS) unit for providing access to a communication network; and
a memory coupled to the processor, the memory storing a first computer-readable program code that, when executed on the processor, is configured to operate the CMTS unit to: send a request to at least one cable modem to measure a signal strength of a signal received by the at least one cable modem on at least two frequencies, receive two or more signal strength measurements on said at least two frequencies, measured by the at least one cable modem, from the at least one cable modem, and adjust gain and slope parameters to be used for communication with the at least one cable modem, based at least partially on the two or more signal strength measurements on said at least two frequencies.

2. The apparatus according to claim 1, wherein the apparatus further comprises a programmable controllable switch for switching ON/OFF the one or more cable television signals.

3. The apparatus according to claim 1, wherein the apparatus conforms to Data Over Cable Service Interface Specification.

4. A method for configuring two or more communication-related parameters in a cable modem system, via an apparatus, the method comprising:
sending, via a cable modem termination system (CMTS) unit of the apparatus, a request to at least one cable modem to measure a signal strength of a signal received by the at least one cable modem on at least two frequencies;
receiving, via the CMTS unit of the apparatus, two or more signal strength measurements on said at least two frequencies, measured by the at least one cable modem, from the at least one cable modem; and
adjusting gain and slope parameters to be used for communication with the at least one cable modem, based at least partially on the two or more signal strength measurements on said at least two frequencies.

5. The method according to claim 4, wherein the two or more communication-related parameters are adjusted automatically.

6. The method according to claim 4, further comprising switching OFF one or more cable television signals.

* * * * *